No. 896,665. PATENTED AUG. 18, 1908.
S. S. RIDER.
SCREW CUTTING DIE STOCK AND DIE.
APPLICATION FILED AUG. 23, 1906.
2 SHEETS—SHEET 2.
Fig. 4.
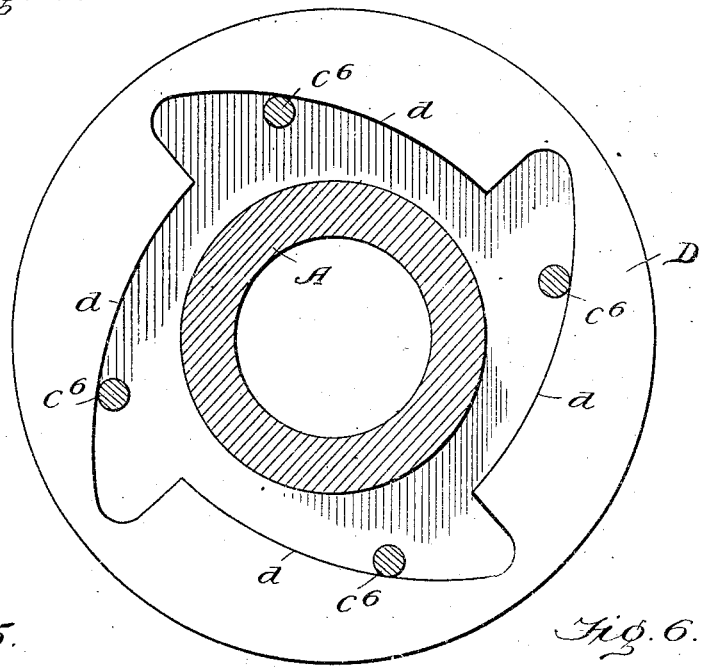
Fig. 5.
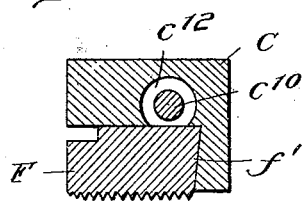
Fig. 6.
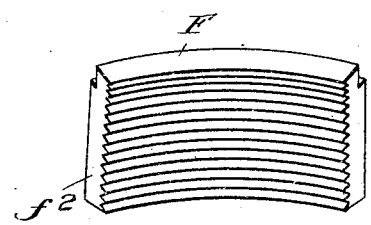
Fig. 8
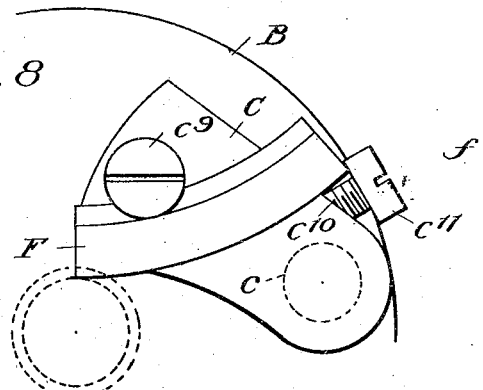
Fig. 7.
Inventor
Samuel S. Rider
Witnesses
Edwin L. Bradford
H. H. Byrne
By Meyers, Cushman & Rea
Attorneys

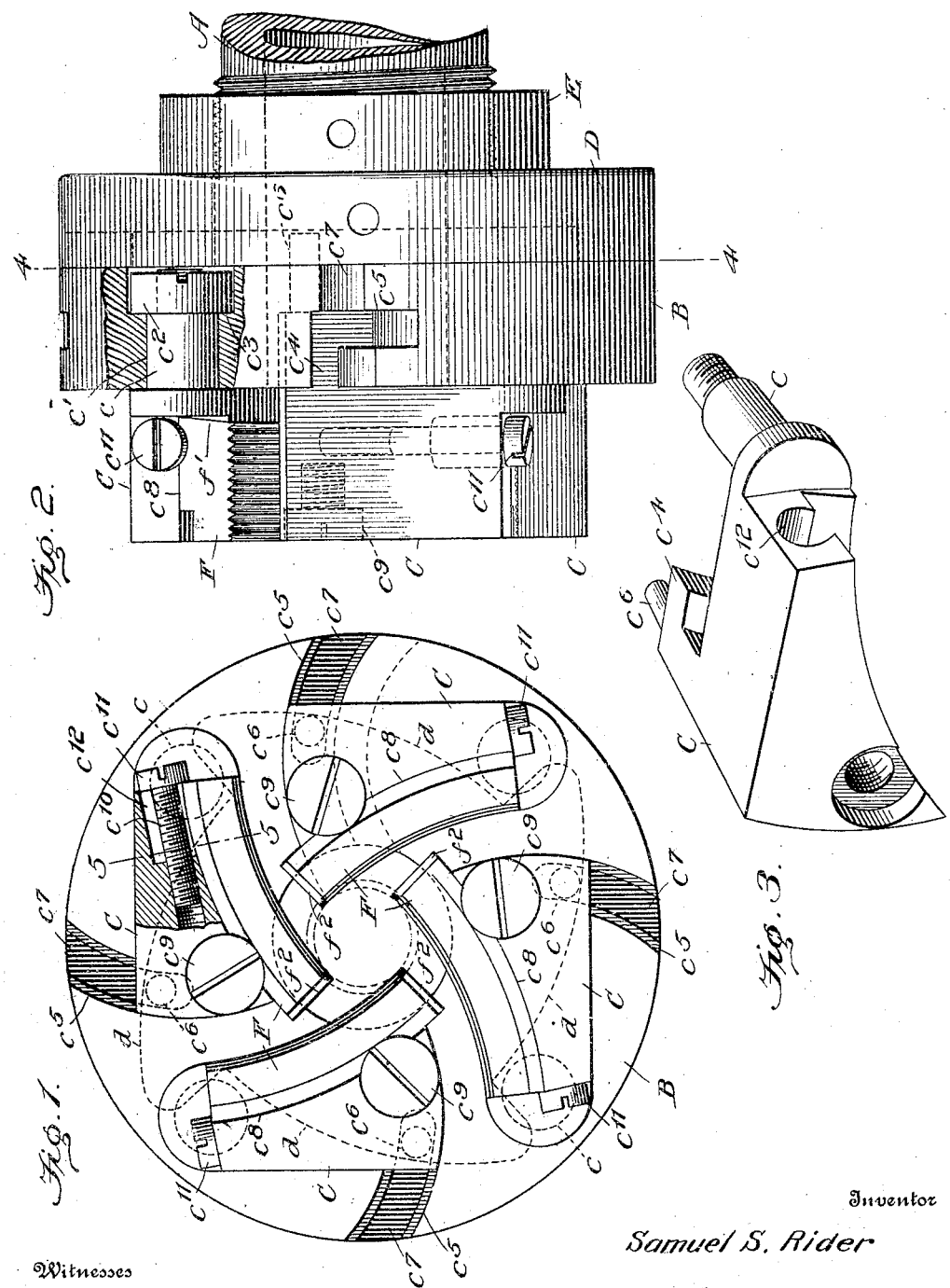

UNITED STATES PATENT OFFICE.

SAMUEL S. RIDER, OF WASHINGTON, DISTRICT OF COLUMBIA, ASSIGNOR OF ONE-HALF TO RICHARD E. MILLER, OF WASHINGTON, DISTRICT OF COLUMBIA.

SCREW-CUTTING DIE-STOCK AND DIE.

No. 896,665.  Specification of Letters Patent.  Patented Aug. 18, 1908.

Application filed August 23, 1906. Serial No. 331,782.

*To all whom it may concern:*

Be it known that I, SAMUEL S. RIDER, a citizen of the United States, residing at Washington, in the District of Columbia, have invented new and useful Improvements in Screw-Cutting Die-Stocks and Dies, of which the following is a specification.

This invention relates to dies and die-stocks used in cutting threads on bolts, pipes, etc., and the object of my invention is to produce a die or chaser which is easily and economically manufactured, which has a much longer life than those now in use and which is easily adjusted in the chaser holder mechanism. This object I accomplish by giving my improved die or chaser an arched or curved shape, which is made, preferably, by taking a short section of a cylinder and putting it in a lathe and cutting or hobbing suitable thread cutting grooves on one or the other of its concentric curved surfaces. This section of cylinder is then cut into suitable sections so as to form my individual dies or chasers. The cutting end of my improved die or chaser is beveled from the front to the back. The purpose of this bevel is to form a pilot for the threads on the blank after such threads have passed the cutting part of the chaser or die. My die can be readily resharpened by removing a small section of the beveled end of the die carrying the worn or dulled ends of the cutting grooves. In the sharpening operation no re-annealing or rehobbing is necessary, of course the sharpened die will have the same bevel and general contour as the die had originally. This sharpening can be readily done by grinding and may be repeated many times thus giving the die or chaser a long life and high efficiency.

A further object of my invention is to provide an improved holder for the die or chaser, which will hold the die rigidly and securely in position and which is also readily adjustable. This object is accomplished by securing the holder to the die-stock by means of a pivot on the holder which is secured in the die-stock, and a guide on the holder preferably L-shaped, sliding in a suitable guideway in the die stock. I further provide suitable projections on the guides, and slots in the periphery of the die-stock and in which the said projections are adapted to move so as to be engaged by a rotary cam plate located back of the die-stock. Thus by rotating the cam plate the projections are engaged and the chaser-holders are forced into operative position.

On the inner face of the cutter-holder is located a deep recess in which is placed the die or chaser. The bottom of this recess slopes downward from the front to the back and the die is also beveled on its rear face so as to fit the bottom of the recess. On the front face of the chaser-holder is a screw having a head which engages in a recess in the rear upper corner of the die or chaser, and thus clamps the die or chaser in its socket. From the pivoted end of the chaser-holder is a deep recess or countersink which extends for a distance alongside of the recess in which the die is held. In this countersink is located a screw the head of which is adapted to contact with the end of the die or chaser and feed it forward whenever desired.

Figure 1 is a plan view of the die and die-stock complete. Fig. 2 is a side view of the same. Fig. 3 is a perspective view of the chaser holder. Fig. 4 is a section on the line 4—4 of Fig. 2. Fig. 5 is a section on the line 5—5 of Fig. 1. Figs. 6 and 7 show two different arrangements of the cutting grooves on the chasers. Fig. 8 shows a modified form of mounting the chaser on the chaser-holder.

A represents the shaft to which the die-stock B is rigidly secured. To the front face of this die-stock are pivoted a plurality of chaser-holders C by means of trunnions $c$ which pass through holes $c'$ in the die-stock and are held therein by means of nuts $c^2$ which fit in suitable countersinks $c^3$ in the rear face of the die-stock. On the rear face of each of the chaser-holders are guides $c^4$, preferably L-shaped, which are adapted to slide in L-shaped guide-ways $c^5$. These guide-ways are in the form of an arc of a circle and are concentric with the trunnion $c$ as will be readily seen. In each of the guides $c^4$ are pins $c^6$ which travel in slots $c^7$.

Back of the die-stock is mounted an annular cam plate D held in place by a collar E screw threaded to the shaft A. The face of this cam plate is cut away so as to form concentric cams or cam surfaces $d$ which are adapted to engage the pins $c^6$ and thereby force the ends of the chaser-holders towards the center of the die-stock when the cam plate D is rotated. As each of the pins $c^6$ are actuated by duplicate cams when the cam plate is rotated it will be seen that all the chaser-holders will be advanced simultaneously towards the center of the die-stock, and be adjusted to suit the diameter of the blank on which the threads are to be cut.

The chasers F consist of sections of a cylindrical shell and are therefore straight in one direction, i. e., that parallel with the axis of the blank, but curved or arc-shaped in a direction transverse to this. It is to be noted particularly that the radius of curvature of the chasers is considerably greater than that of the largest blank to be cut thereby. Thus the advantages of a practically straight die are obtained, while the great disadvantages incident to the making of such a die are obviated. These chasers or dies are secured in recesses $c^8$, formed in the inner faces of the chaser-holders, being clamped therein by screws $c^9$ the heads of which fit in longitudinal recesses $c^8$ on the back of the chasers or dies.

While my improved chaser-holder is especially adapted for use in connection with a die or chaser of curved or arched form, still it will be seen that this chaser-holder could readily be adapted for use in connection with other forms of dies or chasers without departing from the scope of this invention. The inner faces of the recesses $c^8$ in the chaser-holders are inclined inwardly and the inner face of the chaser or die is beveled at $f'$ so as to fit the inclined face of the recess in the holder. Thus it will be seen that by lowering the screw head $c^9$ the chaser or die is securely held against lateral movements. To feed the chaser or die forward as the cutting end is worn away, a screw $c^{10}$ is located in the outer end of the chaser-holder having a head $c^{11}$ which engages the rear end of chaser or die. This screw $c^{10}$ is located in a deep countersink $c^{12}$ in the end of the chaser-holder. This countersink or recess is for the purpose of enabling one to advance the chaser or die as it is worn away until it becomes too short for further use.

In Fig. 1, I have shown the grooves or cutting surface as located on the concave side of the chaser, but they may be located on the convex face as shown in Fig. 8. In this form the means for securing the chaser to the chaser-holder, and for advancing the chaser are the same as already described. The cutting face of each chaser or die is slightly beveled from the front face to the back as shown at $f^2$. The object of this bevel is to form a pilot for the threads on the blank after such threads have passed the cutting part of the die. As clearly shown by the drawings, practically all the cutting is done by the first three cutting ridges on the die and the remaining grooves or ridges, forming the pilot, are for the purpose of feeding in the blank and to prevent mutilation of the completed threads which would be the case if all the ends of the ridges or grooves were at a tangent to the blank. When the chaser or die is placed in cutting position, the front or cutting face thereof is arranged eccentrically with respect to the work in order to obtain a larger radius, hence a longer chaser consequently increasing its life, which would not be the case if the chaser or die was arranged concentrically or at right angles with respect to the work. The grooves in the chaser may be either inclined or parallel to the face of the chaser or die. In the first instance of course, the chaser will be secured in the chaser-holder so that its face will be perpendicular to the axis of the die-stock, while in the latter it will be inclined.

One of the chief features of my invention is the economy with which the chasers or dies can be manufactured. They are preferably made by suitably hobbing a section of a cylinder and then cutting such cylinder into suitable segments. While this is the preferable method employed in making these dies still they may also be easily made from a straight bar by cutting it into suitable lengths, jigging it into the curved or arched form, and then by hobbing the cutting surface. However, I do not claim herein the method of making these chasers as that will be made the subject of another application. To sharpen the cutter when it becomes worn, the chasers are removed from the chaser-holder and the cutting end of the chaser is ground away. In the sharpening operation the whole end of the chaser with the dulled or worn cutters is removed so as to leave the end of the die with the same contour and shape as it had originally. At the initial annealing the whole die or chaser is hardened, therefore when the end is ground away into the sharpening operation no further annealing is necessary and neither is any rehobbing required. Thus my improved chaser or die possesses great advantages in the sharpening operation, which are not shown in any of the prior devices of this kind. After the chaser has been shortened by the sharpening operation it is pushed forward into cutting position by advancing the screw $c^{10}$. As the chaser may be sharpened many times before it becomes too short for further use it will be seen that my improved chaser has a long life and possesses a much higher efficiency than any of the devices shown in the prior art.

Having fully described my invention, what I claim as new, and desire to secure by Letters Patent is:

1. The combination with a die-stock, of chaser-holders pivotally secured thereon, L-shaped guides on said chaser-holders, projecting pins on the guides, curved guide ways in the face of the die-stock in which said guides and pins travel and means for contacting with said pins and advancing the chaser holders to operative position.

2. The combination with a die-stock, chaser-holders pivoted thereon, curved guide-ways, L-shaped in cross section, in the face of the die-stock, slots on the periphery of the die-stock, L-shaped guides fitting in said guideways, projecting pins on said guides and adapted to slide in said slots and a rotary plate mounted behind the die-stock, having cam surfaces which are adapted to engage the projecting pins and advance the chaser-holders, substantially as described.

3. The combination with a die-stock of chaser-holders pivoted thereon, curved guide ways in the face of the die-stock, headed guides on the chaser-holders and slidably adjusted in said guide ways and means for moving said chaser-holders into operative position.

4. The combination with a die-stock of chaser-holders pivoted thereon headed guides on the chaser-holders, pins connected with said chaser-holders, guide ways in the face of said die-stock, slots on the periphery of the die-stock, said headed guides and pins slidably adjusted in the guide ways and slots respectively, and means for contacting with said pins for advancing the chaser-holders into operative position.

5. The combination of a chaser-holder having an arch shaped recess on its front face, the bottom of said recess sloping backward from the front edge, a concavo-convex chaser or die shaped to conform with said recess and having its bottom face beveled so as to fit the bottom thereof, and means on said chaser-holder for contacting with the outer face of the chaser or die to hold the same in position.

6. In a screw cutting die, the combination of a chaser-holder having an arch shaped recess on its front face, the bottom of said recess sloping backward from the front edge, a concavo-convex chaser or die having its bottom face beveled so as to fit the bottom of said recess, a recess in the upper or rear longitudinal edge of the chaser holder adjacent said arch-shaped recess and a screw threaded in the chaser-holder and having a head which fits into said recess on the chaser-holder and thus clamps the chaser in position.

7. In combination, a die stock, and a screw-cutting die adjustably mounted thereon, said die consisting of a section of a cylindrical shell, the radius of which is greater than that of the blank to be cut, the die being so arranged that the concave side at the cutting edge is tangent to the blank.

8. In a screw cutting machine, the combination with a die stock having a central opening therethrough to receive the blank, of a plurality of chaser holders adjustably mounted on said die stock and ranged around the central opening therein, each of said holders having mounted therein a curved die of greater radius than said opening to afford clearance, each of said dies having its concave face formed into a cutting surface, arranged to contact with the blank to be cut.

9. In combination, a die stock having a central opening therethrough to receive the blank to be cut, and a plurality of dies or chasers mounted on said die stock and tangentially disposed relative to the blank, each of said chasers comprising a section of a cylindrical shell, of greater radius than the blank, having its axis parallel to the axis of the blank, and having its interior face formed into a cutting surface.

In testimony whereof I have hereunto set my hand in presence of two subscribing witnesses.

SAMUEL S. RIDER.

Witnesses:
J. GRANVILLE MEYERS,
RICHARD E. MILLER.